UNITED STATES PATENT OFFICE.

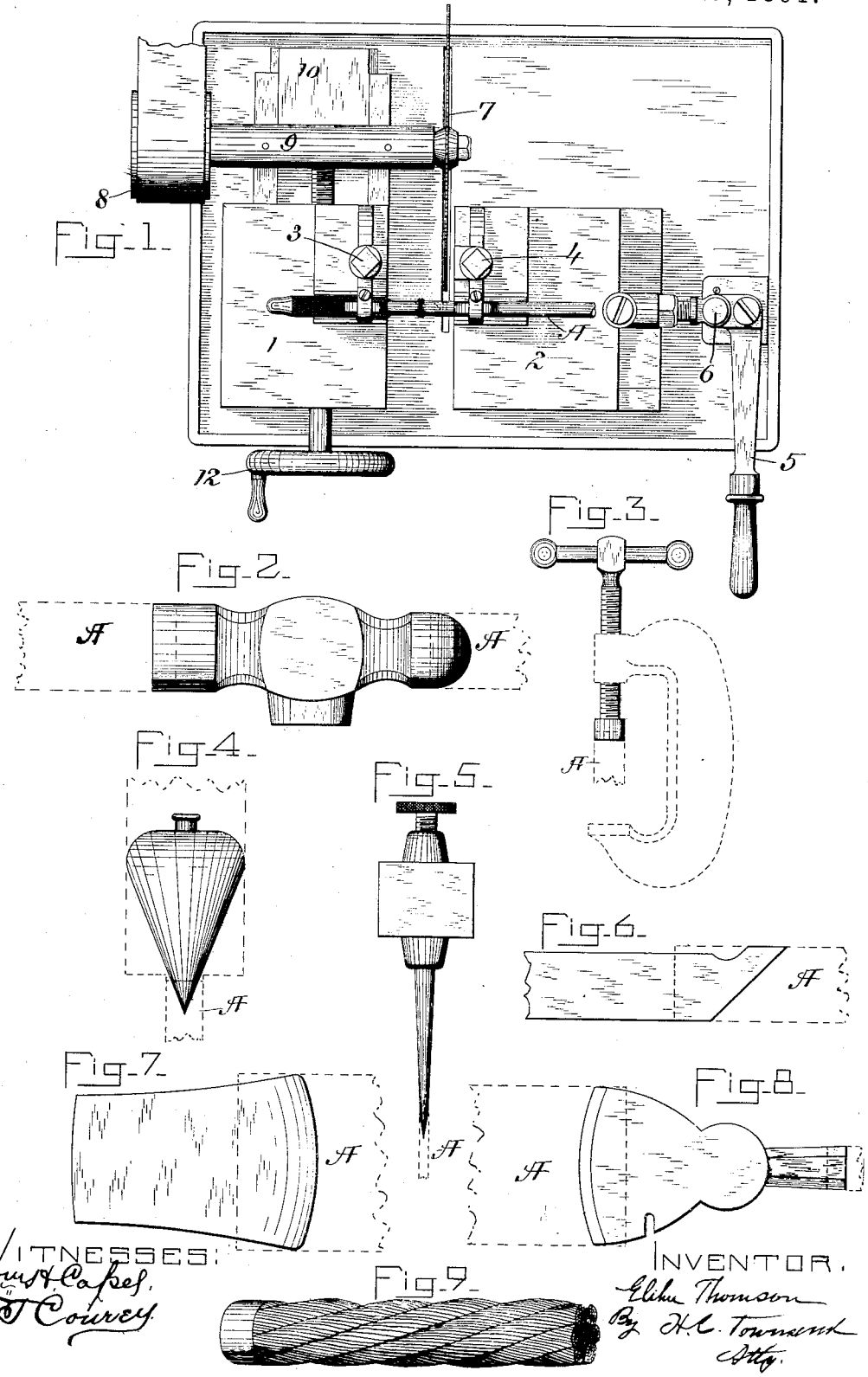

ELIHU THOMSON, OF SWAMPSCOTT, MASSACHUSETTS, ASSIGNOR TO THE THOMSON ELECTRIC WELDING COMPANY, OF MAINE.

MODE OF MAKING TOOLS.

SPECIFICATION forming part of Letters Patent No. 461,856, dated October 27, 1891.

Application filed February 19, 1890. Serial No. 382,110. (No model.)

*To all whom it may concern:*

Be it known that I, ELIHU THOMSON, a citizen of the United States, and a resident of Swampscott, Massachusetts, have invented a certain new and useful Process of Making Tools by Electric Welding, of which the following is a specification.

My invention relates to certain improvements in the application of the electric welding process to the formation of composite metal articles, one part of which is of different material from the other and in the finished article requires to be of irregular or peculiar shape.

My invention is especially useful in those cases where the electric welding process is utilized in the manufacture of tools wherein the wearing or working portion—such as the point or blade—requires to be of a special grade of material, such as tool-steel, while its body or shank portion may be of a lower-grade steel or of other cheaper or more easily worked material. Thus, for instance, my invention may be applied to the manufacture of chisels, hammers, axes, lathe-tools, &c., the main portion of which may consist of steel or iron, which is easily forged, while the blade, point, or wearing portion is made of tool-steel.

Prior to my invention the practice has been, where the electric welding process was utilized, to first give the portion of the article to be attached to the other or body portion the desired or requisite shape that it should have in the finished article and afterward to place it in the clamp of the welding apparatus, abut the two parts together, and pass a current of electricity across the joint for the purpose of welding them in connection with the applied pressure. In this practice many difficulties have been encountered, the principal one being the requirement of specially-shaped clamps in the welding-machine to hold the finished piece, a different clamp being, in fact, required for each size and class of work. Another difficulty has been encountered in the impossibility of properly holding very small objects in the electric welding-clamp, and also in the proper heating of the joint when one of the two parts or portions of the article to be attached together was much larger than the other.

My present invention differs from the prior process in that the irregular or peculiarly-shaped portion of the article is welded on first from a rod or stock-piece of uniform or symmetrical shape, which is afterward cut off to the proper length, and the attached portion is afterward finished to the desired shape by forging, grinding, or otherwise working it into proper form. Thus in the construction of tools the hardened or tool-steel portion of the same would be welded on from a rod or stock-piece, which is then cut off to the proper length, after which the tool, with the attached portion of the stock-piece, is formed to the proper finished shape. It will be obvious that by this procedure I dispense with the necessity of employing specially-shaped clamps and at the same time provide a proper length of material, which may be readily secured in the electric welding-clamps. The plain piece of material, as stated, may be the end of a rod, bar, or plate of uniform or symmetrical cross-section, which is itself put in the welding-clamp and has its end cut off after the welding process, or in the case of some articles it would be possible to take a plain piece of the proper length to form the point or working part of the finished tool, weld it to the body, and afterward finish or shape it to the desired form.

The principal utility of my invention is, however, more evident in cases where the point, blade, or working part of the tool is constructed from hardened steel, which is cut off in proper lengths from a bar or stock-piece, the end of which is welded to the body portion of the tool.

In the accompanying drawings, Figure 1 is a plan of an apparatus which may be employed in practicing my invention. The remaining figures of the drawings illustrate special tools, in the construction of which my invention may be utilized.

1 and 2 represent the terminals of an electric welding-machine of any suitable construction, such terminals forming the terminals of the secondary of a transformer or being otherwise supplied with the heating electric current, which in passing from one terminal to the other through the parts or pieces clamped on such terminals heats said parts to the welding temperature.

3 4 indicate suitable clamps of any desired form or construction adapted to hold the pieces to be welded.

In Fig. 1 I have shown the body and shank of a prick-punch as held in the clamp 3 and a plain steel rod or stock-piece A, from which the point of said prick-punch is to be constructed, held in the clamp 4. The terminal 2 or the clamp held thereon is made movable in the way usual in welding-machines, and is operated for the purpose of applying the welding pressure by means of a lever 5, acting through a toggle-joint at 6, or by other suitable means. 7 indicates a circular saw mounted on a shaft and in proper position to permit it to be moved up to cut off a small portion of the welded end of the rod or stock-piece A after welding has been effected. The bearing 9 for the saw-shaft is supported on a slide 10, and is adapted to be moved by means of a screw 11, so as to bring the saw against the work for the purpose of removing the ends of the stock-bar. 8 is a pulley on the end of the saw-shaft, by means of which the saw may be rotated. The stock bar or piece A is a plain steel rod which is brought up against the end of the prick-punch shank and is welded thereto in the usual way. The rotating saw is then brought forward to saw off a sufficient length of the end of the stock-piece to enable the point of the prick-punch to be formed. The prick-punch body, with the attached piece of the plain steel rod, is then removed from the machine and is subsequently ground down to a point or otherwise manipulated to finish the tool. After the removal of the prick-punch another one may be inserted, the stock or blank rod A abutted against its end, welded, and then cut off to form the point or working portion of the prick-punch, such point being shaped or formed after the welding on of the plain steel rod. By this operation a large number of partly-made tools may be rapidly supplied with the steel wearing parts to be subsequently finished. It will be readily seen that the operation may be quickly and expeditiously performed, since the stock-piece or rod, which is of considerable length, may be readily handled and the clamp may be of simple shape adapted to hold a round piece of metal. The difficulty which would ensue if it were attempted to finish the points separately and then hold them in the clamps for welding is entirely avoided. The result is that the tools may be much more rapidly and easily manufactured than by the process before referred to and employed previous to my invention.

In Fig. 2 I have shown a hammer-head, which is of any ordinary material, such as iron or machine-steel, but which requires to have a face-piece of special-grade steel. In constructing this tool the end of a blank or stock-piece will be brought up against the head of the hammer, the two being clamped in the welding-machine, Fig. 1, and welded to the head, after which the proper length of the stock-piece would be cut off to form the face and would be subsequently shaped or finished as desired. The peen may be formed or constructed in the same way.

Fig. 3 shows a clamp, the knob at the end of the screw portion of which may be constructed in the same manner by welding on from a rod or stock-piece A, which is subsequently cut off.

Fig. 4 represents a plumb-bob, the body of which is, for instance, of brass, while its point is of steel. The utility of my invention is especially noticeable in the construction of an article of this kind, since not only does the conical shape of the body and the point present difficulty in properly clamping the same in the clamps of the welding-machine, but there is also a difficulty in the proper electric welding of the large mass of metal of comparatively good conducting material to the very much smaller piece of metal of lesser conductivity. These difficulties disappear, however, when my invention is employed, since a rough steel bar may be easily welded to the plumb-bob either when finishing or before it is turned from the original brass piece and the end of such bar cut off and subsequently finished to make the steel point.

Fig. 5 shows a trammel-point, the wearing end of which may be constructed in the same way.

Fig. 6 illustrates a lathe-tool, the cutting-part of which may be welded to the body in the rough from a steel bar or blank, the end of which is afterward cut off and subsequently forged and ground to make the lathe-tool cutting-point.

Fig. 7 indicates the invention as carried out in the construction of an ax, and Fig. 8 in the construction of a hatchet.

In Fig. 9 the welding of a solid piece to the end of a cable makes a good finish to prevent the ends from untwisting.

What I claim as my invention is—

1. The herein-described improvement in the application of the electric-welding process to the formation of composite metal articles, one part of which requires to be of irregular or peculiar shape in the finished article, consisting in welding a rod or stock-piece to one part of the article, cutting off a proper length of such rod or stock-piece, and then finishing or forming the cut-off portion to the desired shape or form.

2. The herein-described improvement in the manufacture of tools having a point, blade, or wearing portion of steel, consisting in welding on such portion from a rod or stock-piece, cutting off the proper length of the welded end, and subsequently forging, grinding, or otherwise working such cut-off portion to the desired form.

3. The herein-described improvement in manufacturing tools having a point, blade, or working part of steel, consisting in placing the body portions of the tools in one clamp of an electric-welding machine, clamping a rod or stock-piece of high-grade steel in the other clamp and abutting its end against the body portion of the tool, electrically welding the two together, cutting off the end of the stock-piece, and then forging, grinding, or otherwise shaping the cut-off end to the desired form to make the point, blade, or working part of the tool.

Signed at Lynn, in the county of Essex and State of Massachusetts, this 16th day of February, A. D. 1891.

ELIHU THOMSON.

Witnesses:
JOHN W. GIBBONEY,
BENJAMIN B. HULL.